US012592349B1

(12) United States Patent
Lyras et al.

(10) Patent No.: US 12,592,349 B1

(45) Date of Patent: Mar. 31, 2026

(54) PROTECTIVE SAFETY GLOVE

(71) Applicants: George E. Lyras, Lowellville, OH (US); John N. Grillis, Lowellville, OH (US); Philip T. Dawson, McKeesport, PA (US)

(72) Inventors: George E. Lyras, Lowellville, OH (US); John N. Grillis, Lowellville, OH (US); Philip T. Dawson, McKeesport, PA (US)

( * ) Notice: Subject to any disclaimer, the term of this patent is extended or adjusted under 35 U.S.C. 154(b) by 283 days.

(21) Appl. No.: 18/233,245

(22) Filed: Aug. 11, 2023

(51) Int. Cl.

*H01H 3/02* (2006.01)
*A41D 19/00* (2006.01)
*H01H 27/00* (2006.01)

(52) U.S. Cl.

CPC ....... *H01H 27/002* (2013.01); *A41D 19/0037* (2013.01); *H01H 3/0226* (2013.01); *A41D 2600/20* (2013.01); *H01H 2300/026* (2013.01)

(58) Field of Classification Search

CPC ............... H01H 27/002; H01H 3/0226; A41D 19/0037; A41D 19/00; A41D 19/0041; A41D 19/01594

USPC ...... 200/43.05, 61.77, 543, 538; 2/159, 160, 2/161.4, 162, 161.6; 206/37, 37.1, 37.2, 206/37.3; 452/127; 451/102, 38, 75

See application file for complete search history.

(56) References Cited

U.S. PATENT DOCUMENTS

| | | | | |
|---|---|---|---|---|
| 2,041,254 A | | 5/1936 | Lipshutz | |
| 3,861,349 A | | 1/1975 | Conley | |
| 4,159,792 A | | 7/1979 | Siegal | |
| 4,195,722 A | | 4/1980 | Anderson et al. | |
| 4,670,909 A | | 6/1987 | Forrester | |
| 4,791,682 A | | 12/1988 | Herr et al. | |
| 4,814,632 A | | 3/1989 | Glaeser et al. | |
| 5,201,684 A | | 4/1993 | DeBois, III | |
| 6,212,688 B1 | | 4/2001 | Leslie | |
| 6,554,252 B2 | | 4/2003 | Kazerooni et al. | |
| 7,237,273 B2 | * | 7/2007 | Hernandez | A41D 19/015 2/163 |
| 11,470,896 B2 | * | 10/2022 | Green | A41D 19/0044 |
| 2002/0062514 A1 | * | 5/2002 | Soter | A41D 19/0037 2/160 |
| 2012/0135670 A1 | | 5/2012 | Baer | |
| 2013/0258644 A1 | * | 10/2013 | Comunale | A41D 19/0157 362/103 |
| 2014/0173804 A1 | * | 6/2014 | Matos | A45F 5/06 24/3.12 |
| 2016/0165976 A1 | * | 6/2016 | Scopelliti | A41D 19/0027 2/160 |
| 2018/0235294 A1 | | 8/2018 | Salisbury et al. | |

* cited by examiner

*Primary Examiner* — William A Bolton

(74) *Attorney, Agent, or Firm* — Goldstein Law Offices, P.C.

(57) ABSTRACT

A safety apparatus to facilitate safe operation of an industrial machine. The safety apparatus includes a glove body, a coupling element, and a latch assembly. The glove body includes a hand portion and a contiguous wrist portion configured to entirely cover a hand, thumb, fingers, and wrist of a user. The coupling element is mechanically fixed to a dorsal side of the wrist portion near the bottom edge and includes a loop member engaged with an attachment ring. The latch assembly is releasably coupled to the attachment ring and securely attached to a kill cord configured to releasably engage a control switch of an industrial machine.

19 Claims, 5 Drawing Sheets

PROTECTIVE SAFETY GLOVE

TECHNICAL FIELD

The present disclosure relates generally to personal protective equipment and safety devices. More particularly, the present disclosure relates to personal protective equipment for use during operation of hazardous machinery or equipment.

BACKGROUND

Protective safety gloves are essential in various industries and applications, and especially in environments that involve potentially hazardous machinery or equipment. A safety mechanism such as a deadman's switch may also be implemented. Typically, a deadman's switch includes a kill cord attached to the user that must remain engaged with a control switch of a vehicle, heavy machinery, or other potentially hazardous equipment to permit its operation. If the kill cord is released or disengaged from the control switch, the vehicle, machinery, or other equipment immediately stops, thereby preventing accidents and/or injuries.

Requiring simultaneous use of both safety gloves and a kill cord, however, creates various problems. Existing safety glove designs make it difficult to efficiently and securely retain connection between the kill cord and the control switch, leading to unintended interruptions and inefficiencies during machine operation. These issues tend to be exacerbated where the heavy machinery or equipment requires operation of an industrial hose, as a kill cord tends to interfere with a user's ability to change hand position relative to the hose or alternate the hose between hands. This process can become very cumbersome and tiresome, thereby substantially increasing the likelihood that a user will utilize the kill cord improperly or not at all, thereby eliminating any protection that it might otherwise provide.

Accordingly, there is a need for a safety apparatus and system to reliably retain engagement between a kill cord and associated control switch during machine operation. Also, what is needed is a safety apparatus and system that is convenient and easy for users to utilize while operating an industrial hose. The present disclosure addresses these and other issues.

BRIEF SUMMARY

According to one aspect of the present disclosure, a safety apparatus to facilitate safe operation of an industrial machine includes a glove body, a coupling element, and a latch assembly. The glove body includes a hand portion and a contiguous wrist portion configured to entirely cover a hand, thumb, fingers, and wrist of a user. The coupling element is mechanically fixed to a dorsal side of the wrist portion near the bottom edge and includes a loop member engaged with an attachment ring. The latch assembly is releasably coupled to the attachment ring and at least a portion of the latch assembly is configured to couple to a kill cord. The kill cord is configured to releasably engage a control switch of an industrial machine such that disengagement of the kill cord from the control switch automatically deactivates the industrial machine.

In some embodiments, the latch assembly includes a releasable clasp rotatably coupled to a swivel. The swivel is configured to couple to the kill cord. In certain embodiments, the kill cord includes a ball and chain configuration. The ball and chain configuration includes a chain portion extending between a first end and a second end and a ball coupled to the first end. In some embodiments, the chain portion includes a length sufficient to allow the ball to engage the control switch during operation of the industrial machine.

In some embodiments, the safety apparatus includes at least one fastener mechanically fixing the coupling element to the wrist portion. The fastener is configured to withstand ricochet from the industrial machine. In some embodiments, the loop member is radially offset from a center of the dorsal side of the wrist portion. The loop member may include an elongate strip extending along a longitudinal axis between a proximal end and a distal end. The elongate strip may double back on itself to form a loop at the distal end. In some embodiments, the longitudinal axis substantially aligns with a thumb portion of the glove body. In some embodiments, the attachment ring overlies at least a portion of the hand portion.

In some embodiments, the loop member includes a proximal end and a distal end. The proximal end is attached to the wrist portion and the distal end forms a loop that is pivotable with respect to the wrist portion. The attachment ring is engaged with the loop. In some embodiments, at least one fastener is mechanically fixed to the proximal end of the loop member and the wrist portion and is configured to withstand ricochet from the industrial machine.

According to another aspect of the present disclosure, a safety system to facilitate safe operation of a high-pressure hose of an industrial machine may include a kill cord, a first glove body, a second glove body, and a latch assembly. The kill cord is configured to releasably engage a control switch of an industrial machine having a high-pressure hose. The control switch is coupled to the high-pressure hose such that disengagement of the kill cord from the control switch automatically deactivates the industrial machine. In some embodiments, the industrial machine is a sandblasting machine.

The first glove body has a first coupling element to securely releasably retain the kill cord and the second glove body has a second coupling element to securely releasably retain the kill cord. The first glove body and the second glove body each include a hand portion, a wrist portion, a dorsal side, and a bottom edge. The hand portion is configured to entirely cover a hand, a thumb, and fingers of a user and the wrist portion is configured to entirely cover a wrist of the user. The hand portion is contiguous with the wrist portion.

The first and the second coupling elements each include a loop member engaged with an attachment ring. The loop member is mechanically pivotably fixed to the dorsal side of the wrist portion near the bottom edge. The latch assembly is releasably coupled to the attachment ring and at least a portion of the latch assembly is configured to couple to the kill cord. The latch assembly is configured to releasably attach to exactly one of the first coupling element and the second coupling element.

In some embodiments, the latch assembly includes an eyelet ring, a swivel, and a releasable clasp. The eyelet ring is securely coupled to the kill cord, and the releasable clasp is rotatably coupled to the swivel. The releasable clasp may be self-locking. In some embodiments, the releasable clasp includes a spring-loaded gate. In some embodiments, the releasable clasp includes a lever projecting from the spring-loaded gate. The lever is configured to facilitate removing and/or attaching the latch assembly from the first coupling element or the second coupling element using a single hand.

In some embodiments, the eyelet ring is integrated with the kill cord. The kill cord may include a ball and chain configuration including a chain portion extending between a first end and a second end and a ball coupled to the first end. The eyelet ring may be integrated into the chain portion.

In some embodiments, the loop member includes an elongate strip extending along a longitudinal axis between a proximal end and a distal end. The elongate strip doubles back on itself to form a loop at the distal end. In some embodiments, the longitudinal axis substantially aligns with a thumb portion of the first glove body or the second glove body.

The present disclosure addresses at least one of the foregoing disadvantages of the prior art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE EMBODIMENTS

As discussed above, existing industrial glove designs do not provide an efficient and secure mechanism to retain the kill cord, leading to a risk of accidental disconnection during use. Further, users typically alternate equipment between hands several times during machine operation. This process can become very cumbersome and tiresome when the kill cord must also be removed and re-situated each time. As a result, there is also a substantial risk that users will choose not to attach the kill cord to themselves at all, thereby eliminating any protection that a deadman's switch could otherwise provide. The present disclosure addresses these and other issues.

As used herein, the term "distal" refers generally to a location or direction towards the fingertips of a glove and away from a body of the user. The term "proximal" refers to a location or direction towards the wrist portion of the glove and the body of the user. As used herein, the term "industrial machine" refers to any heavy equipment, machinery, vehicle, and/or other potentially hazardous machine or equipment. As used herein, the term "kill cord" refers to any key, ball and chain, or other suitable mechanical mechanism to engage a control switch to permit operation of an associated industrial machine. Pulling or otherwise disengaging the kill cord from the control switch will automatically trigger deactivation of the industrial machine.

Figure 1:
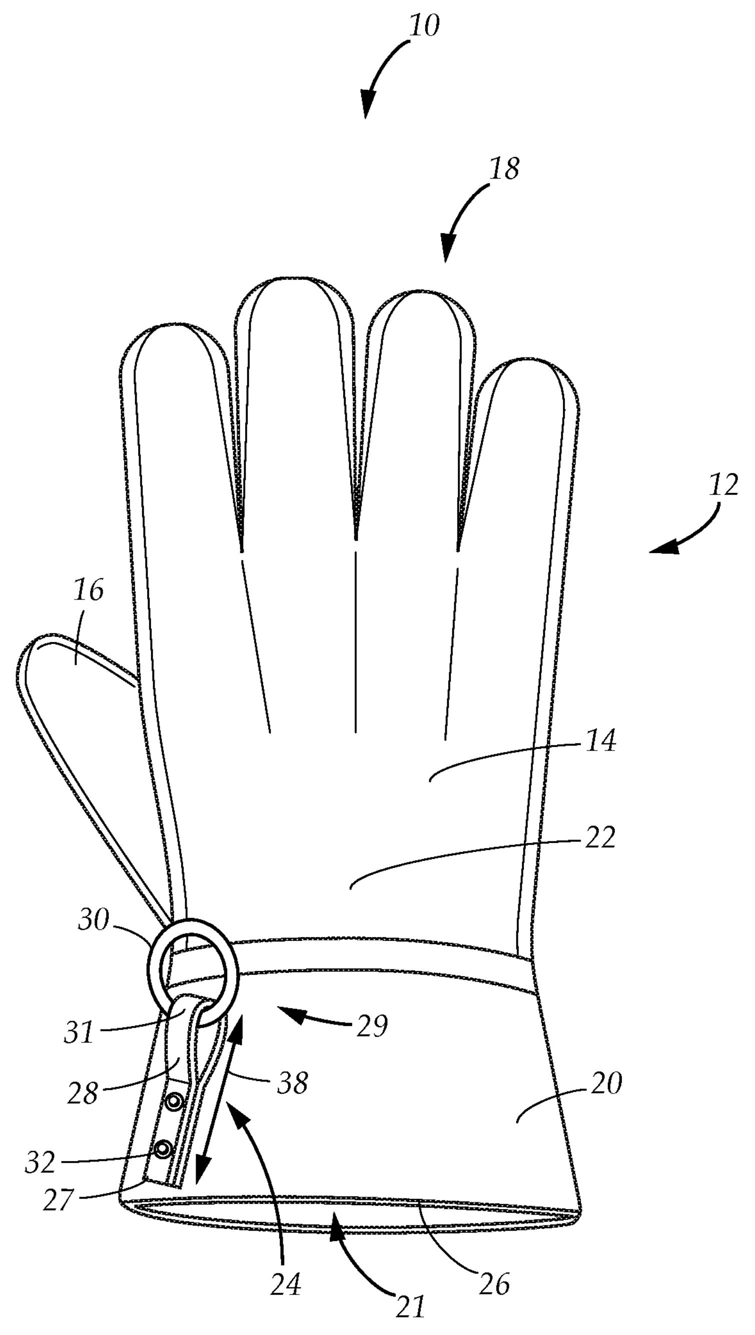
FIG. 1 is a top perspective view of a safety apparatus in accordance with some embodiments of the disclosure.

Referring now to FIG. 1, a safety apparatus 10 to facilitate securing a kill cord during operation of an industrial machine in accordance with some embodiments includes a protective glove body 12 and a coupling element 24. The coupling element 24 may be attached to at least a portion of the outer surface of the protective glove body 12. The protective glove body 12 may include a hand portion 14 and a contiguous wrist portion 20. The hand portion 14 may include a thumb portion 16 and a finger portion 18 such that the hand portion 14 is configured to entirely cover a user's hand, thumb, and fingers. The wrist portion 20 may be configured to entirely cover a user's wrist.

In some embodiments, a bottom edge 26 of the wrist portion 20 may also form the bottom edge 26 of the protective glove body 12. In certain embodiments, the bottom edge 26 forms an opening 21 through which a user's hand may be introduced. For example, in some embodiments, opposing sides of the bottom edge 26 are separated to create the opening 21. In these and other embodiments, a user may extend a hand through the opening 21 to don the safety apparatus 10.

In some embodiments, the protective glove body 12 includes a durable, high-strength material to protect the user. The protective glove body 12 may be flexible to provide user comfort, thereby increasing a likelihood that the user will wear the safety apparatus 10. The protective glove body 12 may also be abrasion-resistant, cut-resistant, corrosion-resistant and/or heat-resistant. In some embodiments, the protective glove body 12 includes a natural and/or synthetic material such as leather, goatskin, rubber, vinyl, Kevlar, composites thereof, and/or the like. In one embodiment, the protective glove body 12 includes a fiber-metal blend including stainless steel.

In some embodiments, the coupling element 24 is attached to a dorsal side 22 of the protective glove body 12. The coupling element 24 may include a robust, high-strength material able to withstand extreme conditions and abrasive materials, including ricochet from an associated industrial machine. In some embodiments, the coupling element 24 is abrasion-resistant, cut-resistant, corrosion-resistant and/or heat-resistant. For example, in certain embodiments, the coupling element 24 may include a robust natural and/or synthetic material such as leather, goatskin, rubber, vinyl, nylon, plastic, Kevlar, composites thereof, and/or the like.

The coupling element 24 may be fixed to the wrist portion 20 so as not to interfere with the user's hand movement and dexterity. In some embodiments, the coupling element 24 is securely attached to the dorsal side 22 of the wrist portion 20 near the bottom edge 26 of the protective glove body 12. In one embodiment, the coupling element 24 is radially offset from a center of the dorsal side 22 and substantially aligns with a position of the thumb portion 16.

In some embodiments, the coupling element 24 extends along a longitudinal axis 38 and includes a loop member 28 coupled to an attachment ring 30. The loop member 28 may be elongate between a proximal end 27 and a distal end 31. A loop 29 may be formed at one end of the loop member 28. In certain embodiments, as shown, the loop 29 is formed at the distal end 31 of the loop member 28.

In some embodiments, the loop member 28 includes one end fixed to the wrist portion 20 via one or more fasteners 32. In some embodiments, the loop member 28 is pivotable or otherwise movable with respect to the wrist portion 20. In one embodiment, the fasteners 32 attach the proximal end 27 of the loop member 28 to the wrist portion 20. In some embodiments, the fasteners 32 include one or more corrosion-resistant rivets made of metal or metal alloys such as brass, stainless steel, titanium, nickel, duplex or super duplex stainless steels, Inconel, Incoloy, zirconium, tantalum, and/or the like.

In some embodiments, the attachment ring 30 is coupled to the loop 29 formed by the loop member 28. The attachment ring 30 may be configured to securely releasably retain a kill cord 34, as shown and discussed with reference to FIGS. 2 and 3 below. In some embodiments, the attachment ring 30 is composed of hardened and/or tempered steel, another suitable metal or metal alloy, or combination thereof. The attachment ring 30 may be freely movable, slidable, and/or pivotable with respect to the loop 29. In some embodiments, the attachment ring 30 includes an O-ring, a D-ring, a carabiner ring, or any other suitable ring. In one embodiment, the attachment ring 30 includes a split key ring configuration to securely couple the attachment ring 30 to the loop 29. In other embodiments, the attachment ring 30 is securely coupled to the loop 29 via a suitable mechanical fastener, adhesive, soldering, welding, a combination thereof, or any other suitable device or technique.

In some embodiments, the attachment ring 30 extends from the loop member 28 in a distal direction. In these and other embodiments, the attachment ring 30 may extend to and/or may overlie at least a portion of the hand portion 14 of the protective glove body 12.

Figure 2:
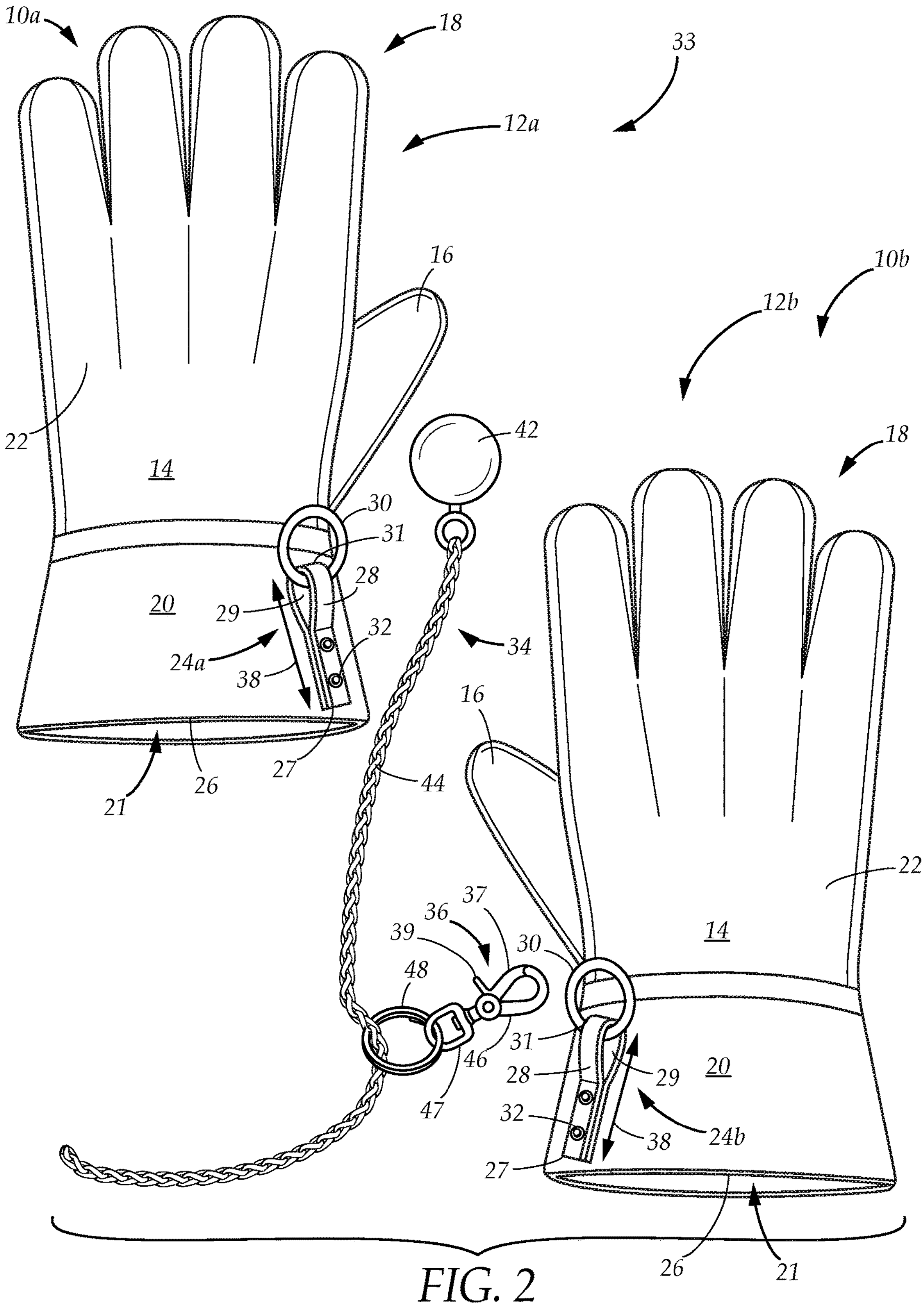
FIG. 2 is a top perspective view of one embodiment of a safety system having two glove bodies and a kill cord in accordance with certain embodiments.
Figure 3:
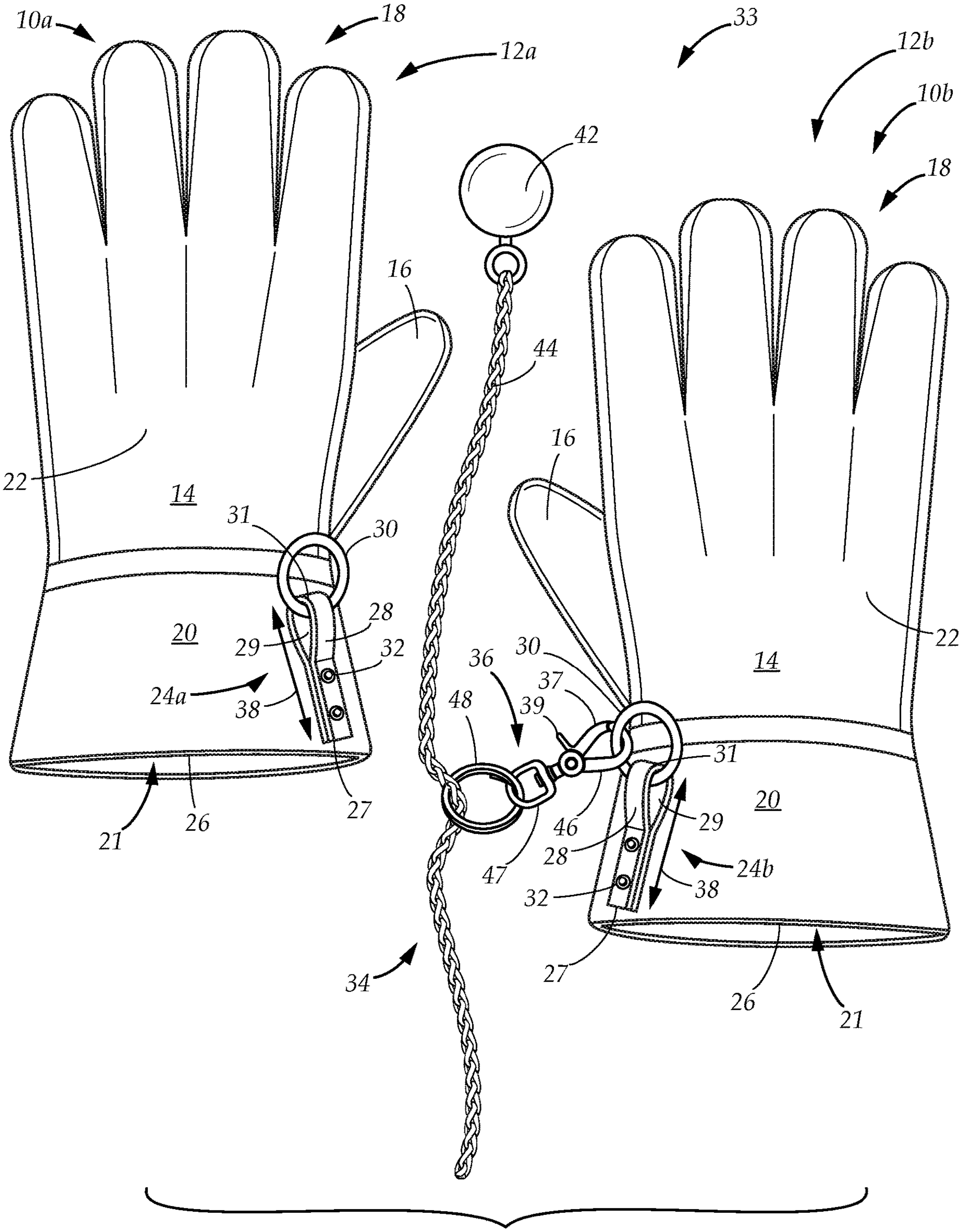
FIG. 3 is a top perspective view of the safety system of FIG. 2 illustrating the kill cord coupled to one of the glove bodies in accordance with the disclosure.
Figure 4:
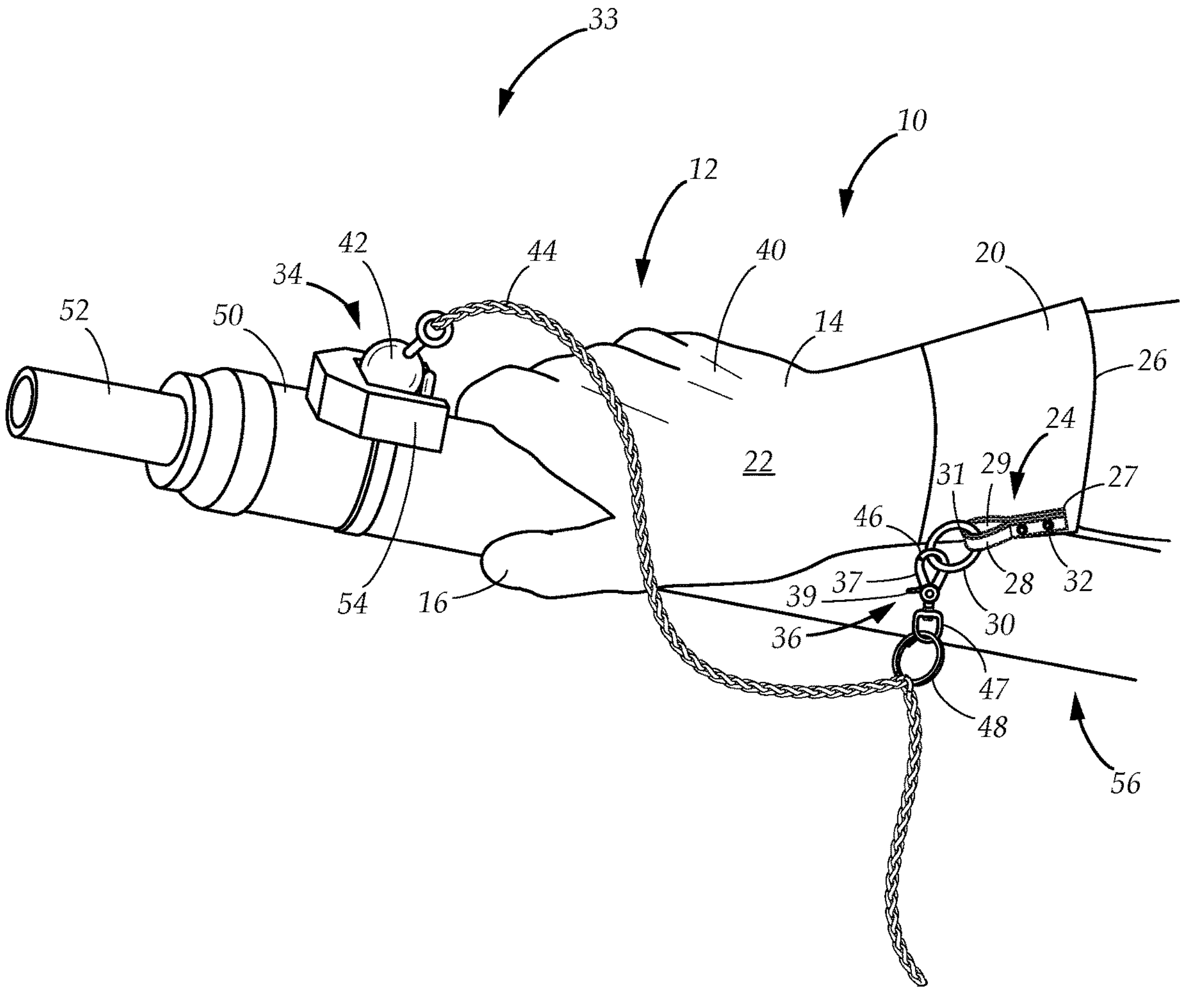
FIG. 4 is a side perspective view of another embodiment of a safety system with a kill cord coupled to a high-pressure hose in accordance with certain embodiments.

Referring now to FIGS. 2 and 3, a safety system 33 may be provided to facilitate a user's ability to safely alternate a component of an industrial machine 56, such as a high-pressure blast hose 50 (as illustrated in FIG. 4), between hands. In some embodiments, the safety system 33 includes two safety apparatuses 10*a*, 10*b*—one for each of a user's hands. Thus, in some embodiments, the safety system 33 includes a first glove body 12*a* having a first coupling element 24*a* and a second glove body 12*b* having a second coupling element 24*b*. The first coupling element 24*a* and the second coupling element 24*b* may each be configured to securely releasably retain a kill cord 34.

As previously discussed, the coupling elements 24*a*, 24*b* may be attached to at least a portion of the outer surface of the associated protective glove body 12*a*, 12*b*. Each protective glove body 12*a*, 12*b* may include a hand portion 14 and a contiguous wrist portion 20. The hand portion 14 may include a thumb portion 16 and a finger portion 18 such that the hand portion 14 is configured to entirely cover a user's hand, thumb, and fingers. The wrist portion 20 may be configured to entirely cover a user's wrist.

In some embodiments, a bottom edge 26 of the wrist portion 20 may also form the bottom edge 26 of each protective glove body 12*a*, 12*b*. In certain embodiments, the bottom edge 26 forms an opening 21 through which a user's hand may be introduced.

In some embodiments, each coupling element 24*a*, 24*b* is attached to a dorsal side 22 of each of the protective glove bodies 12*a*, 12*b*, respectively. In some embodiments, each coupling element 24*a*, 24*b* is securely attached to the dorsal side 22 of the wrist portion 20 near the bottom edge 26 of the associated protective glove body 12*a*, 12*b*. In some embodiments, the coupling element 24*a*, 24*b* is radially offset from a center of the dorsal side 22 of each of the protective glove bodies 12*a*, 12*b* and substantially aligns with the associated thumb portion 16.

In some embodiments, each coupling element 24*a*, 24*b* extends along a longitudinal axis 38 and includes a loop member 28 coupled to an attachment ring 30. The loop member 28 may include an elongate strip doubled over itself to form a loop 29 at one end. In some embodiments, the loop member 28 includes a durable, flexible natural and/or synthetic material such as leather, goatskin, rubber, vinyl, nylon, plastic, Kevlar, composites thereof, and/or the like. The loop member 28 may be configured to withstand extreme conditions and abrasive materials, including ricochet from the industrial machine (not shown). In some embodiments, the loop member 28 is abrasion-resistant, cut-resistant, corrosion-resistant and/or heat-resistant. In some embodiments, the loop member 28 extends between a proximal end 27 and a distal end 31, where the distal end 31 forms a loop 29. In some embodiments, the loop 29 may be configured to retain the attachment ring 30.

In some embodiments, the loop member 28 is attached to the wrist portion 20 of a protective glove body 12*a*, 12*b* via one or more fasteners 32. In one embodiment, one or more fasteners 32 attach the proximal end 27 of the loop member 28 to the wrist portion 20 such that the loop 29 is unattached and/or movable with respect to the protective glove body 12*a*, 12*b*. In other embodiments, one or more fasteners 32 may attach the loop member 28 to the wrist portion 20 at the proximal end 27, the distal end 31, or anywhere therebetween. In some embodiments, the attachment ring 30 is coupled to the loop 29 such that the attachment ring 30 is movable with respect to the loop 29. In some embodiments, the attachment ring 30 extends from the loop member 28 in a distal direction. In these and other embodiments, the attachment ring 30 may extend to and/or overlap at least a portion of the hand portion 14 of the respective protective glove body 12*a*, 12*b*.

Figure 5:
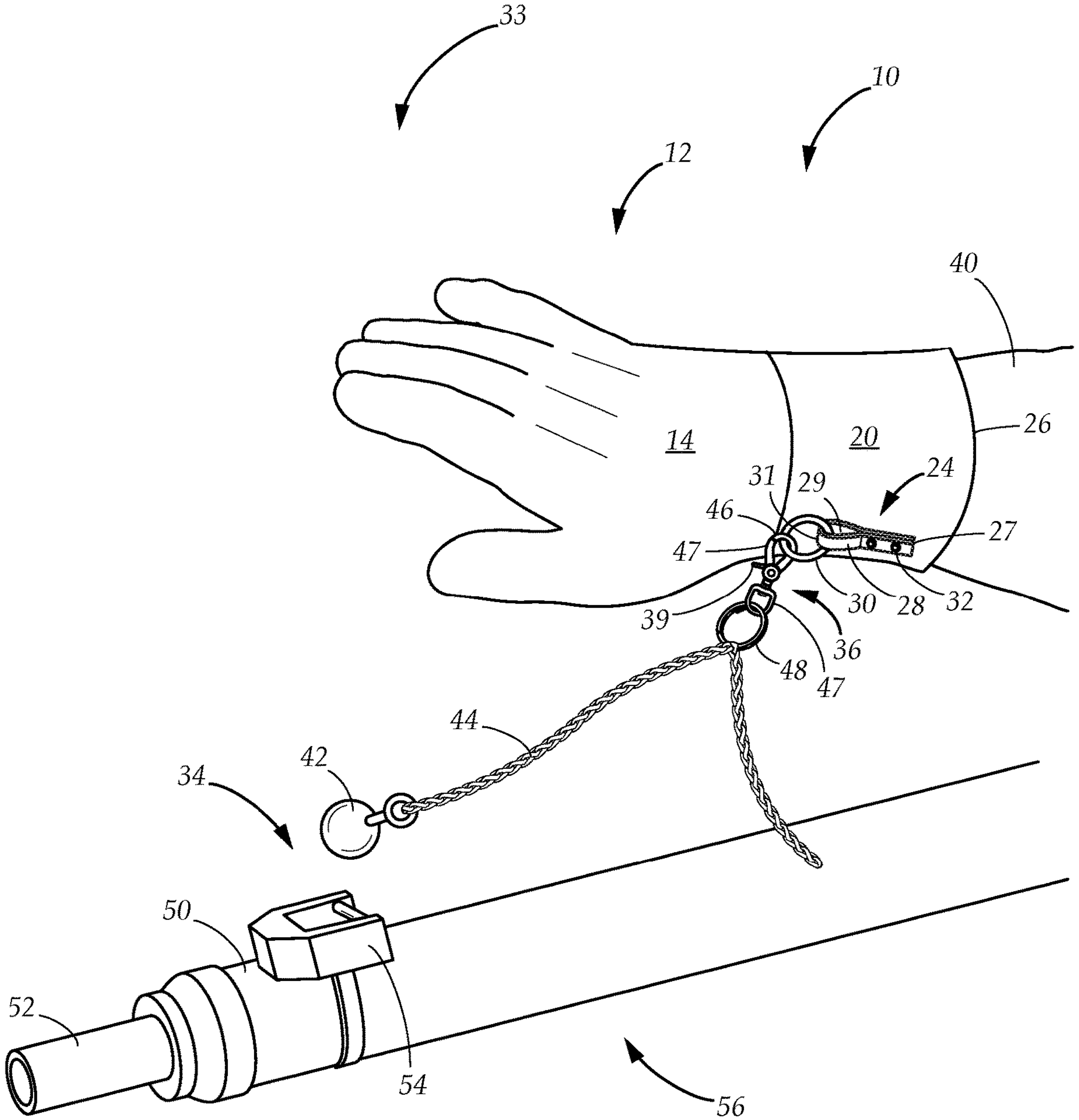
FIG. 5 is a side perspective view of the safety system of FIG. 4 illustrating actuation of the kill cord in accordance with some embodiments of the present disclosure.

Referring now to FIGS. 4 and 5, while still referring to FIGS. 2 and 3, in certain embodiments, the safety system 33 further includes a kill cord 34 directly or indirectly attached to a user's body and releasably coupled to an industrial machine 56 such as a sandblasting or other abrasive blasting unit, a firefighting unit, or other suitable heavy equipment or industrial machinery. If triggered, the kill cord 34 may automatically deactivate the industrial machine 56 to prevent injury to the user.

In some embodiments, the kill cord 34 is a key switch where at least a portion of the kill cord 34 is attached to a user via a cord, lanyard, glove, belt, article of clothing, or other wearable item or device. The "key" portion of the kill cord 34 may be releasably coupled to a control switch 54 of the industrial machine 56. Disengaging the kill cord 34 from the control switch 54 may automatically trigger deactivation of the associated industrial machine 56.

In one embodiment, the kill cord 34 is a key switch having a ball 42 and chain 44 configuration. In some embodiments, a ball 42 may be coupled to one or both ends of the chain portion 44. The ball 42 may be configured to releasably engage a control switch 54 of an associated industrial machine 56 to control power thereto.

As shown, in some embodiments, the kill cord 34 is integrated with or securely coupled to a latch assembly 36. For example, in some embodiments, the latch assembly 36 includes a link or ring 48 integrated into the chain portion 44 of the kill cord 34. In other embodiments, the latch assembly 36 includes an eyelet ring 48 through which at least a portion of the chain portion 44 of the kill cord 34 is disposed. The eyelet ring 48 may be movable along a length of the chain portion 44. In these and other embodiments, a diameter of the ball 42 is larger than a diameter of the eyelet ring 48 to secure the latch assembly 36 with respect to the kill cord 34.

In some embodiments, the latch assembly 36 includes a clasp 46 rotatably coupled to the eyelet ring 48 via a swivel 47 or other suitable attachment mechanism. The swivel 47 may permit the clasp 46 to freely rotate with respect to the eyelet ring 48 and kill cord 34. Significantly, this feature may enable free rotation of the kill cord 34 while maneuvering the industrial machine 56 and/or high-pressure hose 50, thereby preventing unintentional tangling, pulling, or otherwise inadvertently actuating the kill cord 34. In some embodiments, the swivel 47 also facilitates easy attachment and removal of the latch assembly 36 with respect to the coupling element 24.

The latch assembly 36 may be configured to releasably attach to exactly one safety apparatus 10*a*, 10*b* at a time via the attachment ring 30 of the associated protective glove body 12*a*, 12*b*. In some embodiments, latch assembly 36 includes a clasp 46 such as a lobster clasp or other suitable clip, clasp, or latch mechanism securely coupled to the eyelet ring 48. In some embodiments, the clasp 46 is self-locking and may include a spring-loaded gate, a rotary latch, a magnetic latch, a toggle latch, a push latch, and/or any other suitable latch, bolt, gate, or other suitable mechanical fastening mechanism. In one embodiment, the clasp 46 includes a spring-loaded gate 37 configured to quickly and securely couple the latch assembly 36 to the coupling element 24*a*, 24*b* of a safety apparatus 10*a*, 10*b*.

In some embodiments, the spring-loaded gate 37 may be biased relative to the clasp 46 such that the spring-loaded gate 37 easily opens in response to pressure exerted against it toward an opposite side of the clasp 46. In this manner, the clasp 46 may be quickly and easily removed from and/or attached to the coupling element 24*a*, 24*b* of the safety apparatus 10*a*, 10*b*. Similarly, the clasp 46 may automatically and securely close in response to a release of applied downward pressure against the spring-loaded gate 37 and/or a lever 39 or other features coupled thereto. In some embodiments, the spring-loaded gate 37 may be self-locking such that the latch assembly 36 is also prevented from unintentionally detaching from the safety apparatus 10*a*, 10*b*.

In certain embodiments, the spring-loaded gate 37 includes a lever 39, projection, or other feature extending outwardly from the body of the clasp 46. The lever 39 may facilitate the user's ability to identify the clasp 46 and/or spring-loaded gate 37 through the protective glove body 12*a*, 12*b*. The spring-loaded gate 37 and/or lever 39 may facilitate a user's ability to quickly and easily attach the clasp 46 and associated latch assembly 36, including the kill cord 34, to the coupling element 24*a*, 24*b* of a safety apparatus 10*a*, 10*b* in a fail-safe manner. Similarly, the spring-loaded gate 37 and/or lever 39 may facilitate the user's ability to quickly and easily open the clasp 46 and disengage the associated latch assembly 36, including the kill cord 34, from the coupling element 24*a*, 24*b* of a safety apparatus 10*a*, 10*b* as needed.

Referring now to FIGS. 4 and 5, in some embodiments, the kill cord 34 is configured to engage a control switch 54 of an industrial machine 56 configured to deliver material therethrough under high pressure such as a high-pressure abrasive blasting machine, a firefighter's hose, or any other suitable industrial machine 56.

In some embodiments, the kill cord 34 is configured to manually actuate the control switch 54 to maintain power to the industrial machine 56. In one embodiment, the control switch 54 includes a toggle switch and the kill cord 34 is configured to manually deflect the toggle to actuate or otherwise permit operation of the industrial machine 56. In some embodiments, engagement of the kill cord 34 with the control switch 54 completes a circuit interconnecting a source of electrical energy with the industrial machine 56 to maintain power to the machine 56. In other embodiments, the control switch 54 includes an interruption switch movable between an off position that permits operation of the industrial machine 56 and an on position that interrupts the flow of electrical energy to the industrial machine 56.

In some embodiments, the industrial machine 56 includes a high-pressure blast hose 50. The high-pressure blast hose 50 may be configured to convey abrasive material or other material under high pressure from the industrial machine 56 through the blast nozzle 52. In some embodiments, the abrasive material includes steel grit, steel shot, aluminum oxide, coal slag, copper slag, glass bead, stainless steel shot, and/or any other suitable abrasive material. In certain embodiments, compressed air or air otherwise under high pressure mixes with the abrasive material to convey the abrasive material through the high-pressure blast hose 50 at high pressure. When the mixture reaches the blast nozzle 52, the blast nozzle 52 design may rapidly accelerate the air/abrasive material mixture such that the mixture may be evenly dispersed from the high-pressure blast hose 50 in a high velocity pattern.

Controlling the high-pressure blast hose 50 to disperse the mixture of air and abrasive material as needed to obtain a desired surface finish is a potentially dangerous task that requires a user's 40 strength and skill. Safety regulations set by local, state, and federal agencies typically require a user 40 to wear personal protective equipment, including protective gloves, when performing abrasive blasting. Safety regulations may further require users 40 to utilize a deadman's switch including a kill cord 34 and a control switch 54 to control power to the industrial machine 56.

In some embodiments, the control switch 54 is coupled to the high-pressure blast hose 50. As shown, for example, the control switch 54 may be coupled to the high-pressure blast hose 50 and disposed adjacent the blast nozzle 52. The control switch 54 may be coupled to the high-pressure blast hose 50 via one or more fasteners such as one or more metal fittings and/or other suitable mechanical fastening hardware.

A user 40 typically uses both hands to hold the high-pressure blast hose 50 near the blast nozzle 52 to control dispersion of the air/abrasive material therethrough. Thus, in some cases, the user 40 wraps the kill cord 34 around the wrist closest in proximity to the control switch 54 while performing the blasting operation. Accordingly, the kill cord 34 may be coupled to the user 40. It is not uncommon, however, for the user 40 to adjust a hand position and/or orientation of his hands relative to the high-pressure blast hose 50.

To this end, in some embodiments, as shown in FIGS. 2 and 3, the safety system 33 may include a first glove body 12*a* having a first coupling element 24*a* and a second glove body 12*b* having a second coupling element 24*b*. In these and other embodiments, the kill cord 34 may be easily removed from the coupling element 24*a*, 24*b* on one glove body 12*a*, 12*b* and coupled to the other coupling element 24*a*, 24*b* on the other glove body 12*a*, 12*b*.

In some embodiments, the kill cord 34 includes a ball 42 and chain 44 configuration, where one end of the chain portion 44 is attached to the ball 42. The ball 42 may be configured to releasably engage the control switch 54 of the industrial machine 56. Engagement of the ball 42 with the control switch 54 may power on or otherwise permit operation of the industrial machine 56.

To utilize the safety system 33, a user 40 may don a safety apparatus 10*a*, 10*b* on each hand for protection. As previously discussed, each safety apparatus 10*a*, 10*b* includes a protective glove body 12*a*, 12*b* and a coupling element 24*a*, 24*b*. In some embodiments, the coupling element 24 includes a loop member 28 securely attached to the dorsal side 22 of the protective glove body 12. In certain embodiments, the loop member 28 is coupled to the wrist portion 20 of the protective glove body 12 near the bottom edge 26. In one embodiment, the loop member 28 is an elongate strip doubled over itself to form a loop 29 at one end. In some embodiments, the double-layer loop member 28 extends along a longitudinal axis from a proximal end 27 to a distal end 31. In some embodiments, the longitudinal axis of the loop member 28 substantially aligns with a thumb portion 16 of the protective glove body 12.

The loop member 28 may be coupled to an attachment ring 30. In some embodiments, the attachment ring 30 is configured to engage a latch assembly 36 coupled to or integrated with a kill cord 34. In some embodiments, the latch assembly 36 includes a clasp 46 having a releasable locking portion, such as a spring-loaded gate 37. The spring-loaded gate 37 may automatically open the clasp 46 when pressure is applied, and may automatically close and/or lock the clasp 46 when the pressure is released. In some embodiments, the user 40 presses the spring-loaded gate 37 toward an opposite side of the clasp 46 to open the clasp 46 and attach the clasp 46 to the attachment ring 30, thereby coupling the kill cord 34 to the safety apparatus 10. Similarly, the user 40 may press the spring-loaded gate 37 toward an opposite side of the clasp 46 to open the clasp 46 and remove the attachment ring 30, thereby uncoupling the kill cord 34 from the safety apparatus 10.

A length of the kill cord 34, or a length of the chain portion 44 between the ball 42 and the ring 48 of the latch assembly 36, may determine limits within which the industrial machine 56 is operable. In some embodiments, operability of the industrial machine 56 depends on the user 40 maintaining contact with and/or being in close proximity to the control switch 54 such that at least some slack remains in the length of the chain portion 44 between the ball 42 and the ring 48 when the ball 42 is engaged with the control switch 54. In these and other embodiments, the slack may permit some movement of the user's 40 hands relative to the control switch 54 to facilitate the user's 40 ability to perform the blasting operation.

In some embodiments, the kill cord 34 and/or chain portion 44 between the ball 42 and the ring 48 includes a length sufficient to allow the ball 42 to remain engaged with the control switch 54 during performance of a blasting operation. The length of the chain portion 44 between the ball 42 and the ring 48 of the latch assembly 36 may be fixed or adjustable.

In the event the user 40 loses contact with or moves too far away from the control switch 54 and/or high-pressure blast hose 50, the chain portion 44 of the kill cord 34 may pull or otherwise disengage the ball 42 from the control switch 54, causing deactivation of and/or a loss of power to the industrial machine 56.

In some embodiments, however, the user 40 may wish to alternate hands or change a hand position relative to the high-pressure blast hose 50 and/or control switch 54 without interrupting operability of the industrial machine 56. To this end, the user 40 may decouple the latch assembly 36 from the first coupling element 24*a* of the first glove body 12*a* and re-attach the latch assembly 36 to the second coupling element 24*b* of the second glove body 12*b*. In some embodiments, this process of decoupling and recoupling the latch assembly 36 between a first coupling element 24*a* and second coupling element 24*b* may be performed using a single hand.

For example, in certain embodiments, the first coupling element 24*a* is radially offset from a center of the dorsal side 22 of the first glove body 12*a* and the second coupling element 24*b* is radially offset from a center of the dorsal side 22 of the second glove body 12*b*. The first coupling element 24*a* and the second coupling element 24*b* may thus be in close proximity to each other when a user 40 is operating the industrial machine 56 and/or high-pressure blast hose 50. This relative positioning of the first coupling element 24*a* and the second coupling element 24*b* may facilitate the user's 40 ability to move the kill cord 34 between the first glove body 12*a* and the second glove body 12*b* as desired without disrupting operability of the industrial machine 56.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In conclusion, the disclosure is illustrated by example in the drawing figures, and throughout the written description. It should be understood that numerous variations are possible, while adhering to the inventive concept. Such variations are contemplated as being a part of the present disclosure.

What is claimed is:

1. A safety apparatus to facilitate safe operation of an industrial machine, comprising:

a glove body comprising a hand portion, a wrist portion, a dorsal side, and a bottom edge, wherein the hand portion is configured to entirely cover a hand, a thumb, and fingers of a user and the wrist portion is configured to entirely cover a wrist of the user, wherein the hand portion is contiguous with the wrist portion;

a coupling element mechanically fixed to the dorsal side of the wrist portion near the bottom edge, the coupling element comprising a loop member and an attachment ring engaged with the loop member; and a latch assembly releasably coupled to the attachment ring, wherein at least a portion of the latch assembly is configured to couple to a kill cord, wherein the kill cord is configured to releasably engage a control switch of an industrial machine, wherein disengagement of the kill cord from the control switch automatically deactivates the industrial machine, wherein the kill cord comprises a ball and chain configuration, and wherein the ball and chain configuration comprises a chain portion extending between a first end and a second end and the ball coupled to the first end.

2. The safety apparatus of claim 1, wherein the latch assembly comprises a releasable clasp rotatably coupled to a swivel, wherein the swivel is configured to couple to the kill cord.

3. The safety apparatus of claim 1, wherein the chain portion comprises a length sufficient to allow the ball to engage the control switch during operation of the industrial machine.

4. The safety apparatus of claim 1, further comprising at least one fastener mechanically fixing the coupling element to the wrist portion, wherein the at least one fastener is configured to withstand ricochet from the industrial machine.

5. The safety apparatus of claim 1, wherein the loop member is radially offset from a center of the dorsal side of the wrist portion.

6. The safety apparatus of claim 5, wherein the loop member comprises an elongate strip extending along a longitudinal axis between a proximal end and a distal end, wherein the elongate strip doubles back on itself to form a loop at the distal end.

7. The safety apparatus of claim 6, wherein the longitudinal axis substantially aligns with a thumb portion of the glove body.

8. The safety apparatus of claim 7, wherein the attachment ring overlies at least a portion of the hand portion.

9. The safety apparatus of claim 1, wherein the loop member comprises a proximal end and a distal end, wherein the proximal end is attached to the wrist portion and the distal end forms a loop pivotable with respect to the wrist portion, wherein the attachment ring is engaged with the loop.

10. The safety apparatus of claim 9, further comprising at least one fastener mechanically fixing the proximal end of the loop member to the wrist portion, wherein the at least one fastener is configured to withstand ricochet from the industrial machine.

11. A safety system to facilitate safe operation of a high-pressure hose of an industrial machine, comprising:

a kill cord configured to releasably engage a control switch of the industrial machine having the high-pressure hose, wherein the control switch is coupled to the high-pressure hose, wherein disengagement of the kill cord from the control switch automatically deactivates the industrial machine;

a first glove body having a first coupling element configured to securely releasably retain the kill cord;

a second glove body having a second coupling element configured to securely releasably retain the kill cord, wherein each of the first glove body and the second glove body comprises a hand portion, a wrist portion, a dorsal side, and a bottom edge, wherein the hand portion is configured to entirely cover a hand, a thumb, and fingers of a user and the wrist portion is configured to entirely cover a wrist of the user, wherein the hand portion is contiguous with the wrist portion, and wherein each of the first coupling element and the second coupling element comprises a loop member and an attachment ring engaged with the loop member, wherein the loop member is mechanically pivotably fixed to the dorsal side of the wrist portion near the bottom edge; and a latch assembly releasably coupled to the attachment ring, wherein at least a portion of the latch assembly is configured to couple to the kill cord, wherein the latch assembly is configured to releasably attach to exactly one of the first coupling element and the second coupling element.

12. The safety system of claim 11, wherein the latch assembly comprises an eyelet ring, a swivel, and a releasable clasp, wherein the eyelet ring is securely coupled to the kill cord, and wherein the releasable clasp is rotatably coupled to the swivel.

13. The safety system of claim 12, wherein the releasable clasp is self-locking.

14. The safety system of claim 13, wherein the releasable clasp comprises a spring-loaded gate.

15. The safety system of claim 14, wherein the releasable clasp comprises a lever projecting from the spring-loaded gate, wherein the lever is configured to facilitate removing and/or attaching the latch assembly from one of the first coupling element and the second coupling element using a single hand.

16. The safety system of claim 12, wherein the eyelet ring is integrated with the kill cord.

17. The safety system of claim 16, wherein the kill cord comprises a ball and chain configuration comprising a chain portion extending between a first end and a second end and the ball coupled to the first end, wherein the eyelet ring is integrated into the chain portion.

18. The safety system of claim 11, wherein the loop member comprises an elongate strip extending along a longitudinal axis between a proximal end and a distal end, wherein the elongate strip doubles back on itself to form a loop at the distal end.

19. The safety system of claim 18, wherein the longitudinal axis substantially aligns with a thumb portion of the first glove body or the second glove body.

* * * * *